June 29, 1948. W. PETERS 2,444,268
HOLE CLOSURE KNOCK-OUT PLUG
Filed Nov. 30, 1945
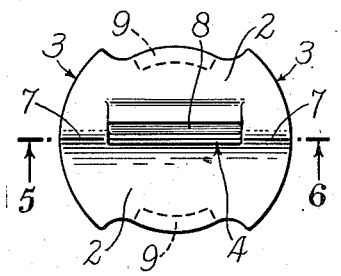
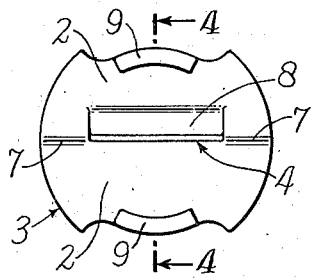
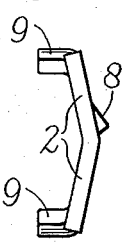
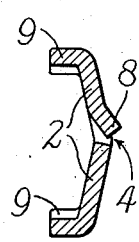
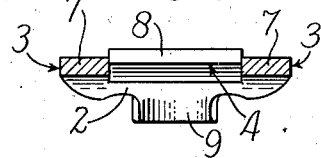
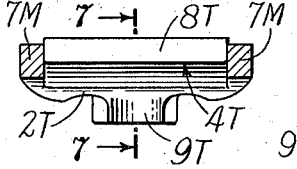
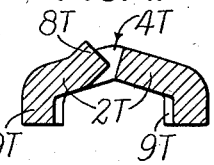
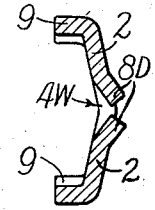
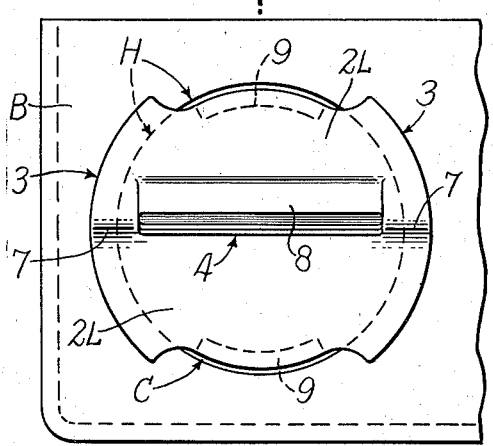
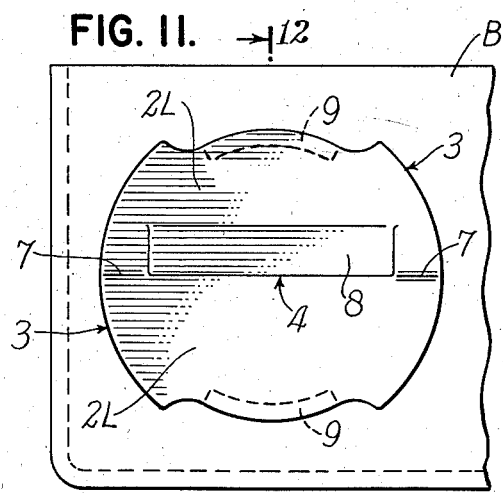
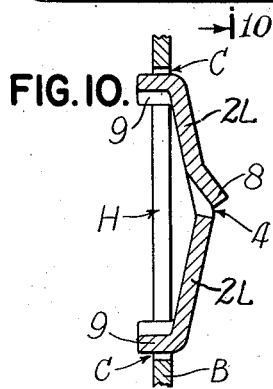
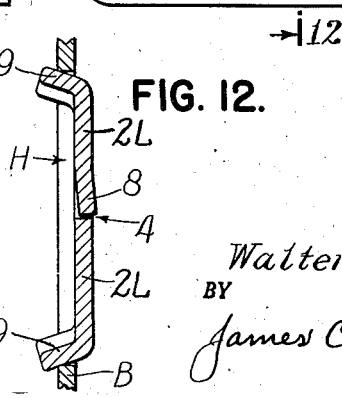
INVENTOR.
Walter Peters
BY
James C. Ledbetter
ATTORNEY Patented June 29, 1948

2,444,268

UNITED STATES PATENT OFFICE 2,444,268

HOLE CLOSURE KNOCKOUT PLUG

Walter Peters, Linden, N. J., assignor to The Thomas & Betts Co., Elizabeth, N. J., a corporation of New Jersey Application November 30, 1945, Serial No. 631,960

2 Claims. (Cl. 220—27)

This invention relates to fittings for closing or covering various size openings and more particularly to closure plugs adapted to be secured in conduit openings of electrical boxes, or to close other openings such as the open ends of pipes or conduits, etc., and is entitled herein as a hole closure knockout plug.

Electrical boxes and the like, used in raceway systems of electrical wiring installations for housing and protecting the cables and wires thereof, frequently have holes (known as knockout openings) which must be covered and closed, as in the case of unused apertures in the boxes; and occasionally the open ends of pipes or conduits in the raceways also must be closed. This invention is proposed as a solution of problems concerning the sealing and covering of openings, encountered in such installations.

There is in general use one type of conventional fitting or closure plug which has an obtuse angular form, made of ductile sheet metal, and is expansible for closing knockout openings in electrical boxes and open ends of conduits, etc. However, such closure plugs are objectional in several respects. For example, difficulty is experienced in hammering or driving the present-day expansible angular plug into place. This fault is due to the resistance offered by the plug to hammering pressure, that is, resistance to the flattening out of its angular shape in reducing it down to disk form by which to expand the plug and anchor it into a raceway hole to close it. And such resistance to bending or flattening pressure is of course due to the mass or amount of material (sheet metal) which must be deformed by hammering down the present-day angular plug into its flattened and anchored position.

Hammering or driving on closure plugs mounted in the walls of electrical boxes damages them and mars the finish thereof, and in particular causes vibration which shakes and loosens the boxes from their foundations as well as loosening the electrical parts on the inside thereof. These faults have heretofore imposed limitations in the manufacture of conventional closure plugs, and there is a tendency to confine them to small sizes or to minimum diameters in order to hold to a minimum the mass of material to be deformed or flattened when installing such plugs to close openings which are found unused as the wiring mechanic nears the completion of an electrical raceway system.

This invention seeks to solve the problems in question by producing a new closure fitting or plug of the angular expansible driven type. The angular bend of this new plug readily may be hammered out flat and the plug forced into place without damaging the box, or shaking it loose from its foundation, or vibrating the electrical parts housed therein. Accordingly, the use of this new plug does not damage the plaster or mar other parts of a wall or building, on which electrical box and conduit systems are installed, and saves the raceway parts from abuse.

Furthermore, this new angular type of easy-driven plug can be made in large sizes which yield under pressure or tool impact when driven flat into locked position even more readily than the present-day small size plugs. Thus the new plug herein, irrespective of its size, is adapted to be installed with light or minimum driving pressure. The invention, therefore, enables the manufacturer to furnish the trade with large closure plugs, irrespective of size, which are capable of the same ease and convenience in their installation as the new small size plugs herein.

Incidentally, this new type of closure plug also can be furnished in thicker form, that is, made of heavier gage sheet metal than now in use, if occasion arises therefor, and they drive into place with like and equal ease or convenience without damage to the previously installed electrical raceway system parts or the walls of the building. Whether small or large, the new heavy or thick gage plugs herein function alike in that they are just as easily installed as the standard gage new plugs herein, that is, they are as readily installed as plugs made of ductile sheet metal of standard or approved gage thinness which meet the requirements of the electrical trade; and all such plugs (the old types as well as the new ones herein) obviously are produced of the minimum gage sheet metal which meet the regulations of the trade.

In carrying out this invention, it will be appreciated that a new and useful predetermined-length slit and lip means is provided in closure plugs of the angular type for reducing the mass of metal which must be deformed when driving them into installed positions. The slit and lip means feature, therefore, provides a uniformly constant bending mass for all sizes of the new plugs herein.

In other words, the invention provides a constant (which a manufacturer may engineer into his tools and dies used in production operations) to eliminate the variable factors otherwise present in the manufacture and use of small and large size closure plugs in order that all sizes thereof may now be produced on a practical basis and installed with like ease and simplicity. This feature also applies equally well to thick and thin plugs alike. Thus it is seen that dimensional proportions do not interpose limitations in the manufacture and use of the new closure plugs herein.

An additional feature resides in the automatic sealing or shutting of the new slit and lip means above mentioned as a result of driving the plug into place. This is an important provision inasmuch as electrical code and other regulations require that closure plugs used in raceway systems present a solid, that is, an imperforate surface in order that their hole-closing function not be impaired.

It is also pointed out that hole closure plugs must be removable since it may become necessary to open previously covered holes in connection with additions or other alterations in electrical raceway systems; and the new plugs herein as readily may be knocked out of an opening by a hammer impact of the same minimum force as first required in installing them.

Having in mind the foregoing, an object of the invention is to produce angular expansible types of driven closure plugs which can be manufactured in all sizes and thicknesses (a variety of dimensional proportions) for closing small and large raceway holes alike and which may be readily and conveniently installed with a light tap of a hammer or other impact tool in order to largely, if not entirely, overcome the disadvantages heretofore discussed.

A further object is to produce closure plugs having simple means such, for example, as the slit and lip means above mentioned, which control and render uniformly constant the bending mass of the plugs for all sizes and all thicknesses thereof and which likewise automatically shuts or seals itself to present an imperforate surface after the plugs are installed in holes to be closed.

This description and the accompanying drawings explain the invention and indicate further purposes thereof, present it in a manner preferred at this time, demonstrate the features thereof in order to disclose the scope and principle of the invention, thus suggesting further examples of construction which may develop out of the teachings herein or which may occur to others who wish to avail themselves of the benefits of the invention, and also aid in understanding the problems sought to be solved.

Figs. 1 thru 8 show three structural examples of small size closure plugs embodying this invention, while in contrast thereto Figs. 9 thru 12 show the plugs made in large sizes. In all four cases, whether small or large, thick or thin (any dimension), a driving impact of minimum force is sufficient to install the closure plugs, one or the other, in final position.

Incidentally, the small size new plugs illustrated are approximately the maximum size of one make of old type plug on the market.

Fig. 1 shows a top view, Fig. 2 a bottom or underneath view, and Fig. 3 an end view of this new closure plug.

Fig. 4 shows a cross-section taken on the line 4—4, while Fig. 5 is a longitudinal section on the line 5—5.

Figs. 6 and 7 show a closure plug produced of somewhat thicker sheet metal (double thickness) than the previously illustrated plugs. Fig. 6 also is a longitudinal section which in effect may be considered as developed on the line 5—5; and Fig. 7 is a section on the line 7—7.

Fig. 8, in effect, shows a modified or third form of construction illustrating a double closing or shutting lip, as distinguished from the single lip first illustrated.

In general, all the views, except Figs. 6 and 7, may be regarded as illustrating plugs made of standard gage sheet metal, that is, the minimum gage for approved manufacture and use.

Fig. 9 shows an elevation of the angular plug (produced in large sizes) inserted in a box hole before it is driven and flattened disk-like into anchored position; and Fig. 10 shows a section on the line 10—10.

Fig. 11 shows the large size closure plug driven flat or disk-like into final anchored position in the box hole; and Fig. 12 shows a cross section on the line 12—12.

As to Figs. 9 thru 12, it is to be understood that they demonstrate equally well the installation of the small plugs in box holes or other openings.

Reference is now made to the drawings for a description of examples of structural embodiments of the invention by which to demonstrate how the limitations as to dimensional proportions (small, large, thick and thin, in any permutation thereof) are removed. Also, a consideration is given of the features believed to be new in connection with rendering constant the variables which have arisen in attempting to use old type angular expansible closure plugs and which in the past have limited them to small sizes.

The drawings show a plug or disk-like member 2 formed of ductile material (sheet metal being used for the purposes herein) and in this instance as having rounded ends 3. A slit 4 is made longitudinally (preferably centered) in the member 2. It is important to observe that each end of the slit 4 terminates short of the spaced end edges 3 of the plug 2. Thus the slit 4 leaves a connecting or joining span 7 at each end of the slit 4 which bridges the fitting into a one-piece member. The two joining spans 7 constitute a ductile bending mass which renders easy and convenient the installation of the closure plug, as further explained.

The formation of the slit 4 provides a longitudinally disposed lip 8 which is bent up and outwardly from the top surface of the plug 2. Thus the slit 4 and its counterpart lip 8 are of the same length and are symmetrically disposed between the two spaced-apart joining span bending masses 7 which are contiguous with each end edge 3. The formation of the lengthwise slit 4 and its lip 8 may leave said slit open more or less (depending somewhat on the setting and adjustment of the punch and die used), and this open slit is automatically shut and made imperforate during the hammering operation of installing the plug in a hole, as will be explained.

The closure plug, in effect, is divided into two half portions 2 and 2, by reason of the two halves being formed at an obtuse angular relation with each other, as will be noted from the sectional and the end views of the drawings. The line of angular bend is made along the axis of the slit 4, as well as the edge of the lip 8, and extends centrally through the ductile joining spans 7. Thus the line of bend is contiguous with or in the plane of the slit 4, and in this construction forms a linear or, in this example, a longitudinal apex or crest produced in the fitting and through the joining spans 7, thereby symmetrically forming a portion of each joining span on each side of the crest or axis of the angular bend of the plug. Thus the plug is manufactured with its built-in obtuse angle (Fig. 3, etc.) but operatively flattens out into an imperforate plane surface when driven into hole-closing (Fig. 12) position.

Next, it will be noted that the plug carries integrally formed anchorage means in the form of ears 9; a pair thereof being shown. Each ear 9 is carried by a longitudinal side edge of the plug, thus providing an ear on each side of the slit and lip linear-apex means 4, 8. The two ears 9 may be formed parallel to each other or substantially so. The ears have outer arcuate surfaces to coincide with and conform to the perimeter of a round hole to be closed inasmuch as the closure-plugs herein are designed more generally for closing circular apertures (as may be anticipated by noting Figs. 9 thru 12, later explained). It will be noted that the two spaced end edges 3 and the two spaced ears 9 (in this example of the invention) are concentric, in that the surfaces of these four portions are formed from a common center.

Thus in appearance, the plug has a partially circular and disk-like formation due to its arcuate end edges 3 and arcuate ears 9, all symmetrical and concentric with respect to the body area of the plug. In effect, the ends 3 and ears 9 are segmental in form, the ears being made on a shorter radius than the ends. The transverse or shorter dimension of the plug (the spacing of the two ears 9) is less than the longitudinal or longer dimension thereof (the spacing between the end edges 3), the purpose of which will be noted hereinafter.

The foregoing description is more or less based upon Figs. 1 thru 5 showing the small size plug but, nevertheless is directed to Figs. 9 thru 12 where the same reference numbers are applied to the large plug, except that said large plug is marked 2L in contrast to the small plug 2. The small plug 2 and large plug 2L are presented to distinguish in size (although made of like gage sheet metal) and in aid of explaining the principle of the invention inhering in the slit and lip means 4, 8 as well as in the constant mass bending or joining spans 7 and 7 all of which are included in the linear and bending apex of the plug.

It will now be seen that the two spaced joining spans 7 of each plug 2 and 2L are the same length and of the same mass. In other words, the length of the slit-lip means 4, 8 is increased proportionately in the large plug 2L in order to form its joining spans 7 equal in length and mass to that of the small plug 2. Therefore, all sizes of closure plugs, for a given gage sheet metal, have joining spans 7 which are of equal mass and hence possess the same characteristics in respect to operatively yielding to a minimum of flattening pressure applied on the outside angle of the linear apex or crest of the plugs when driving them into installed position in an aperture to be closed.

*Figs. 6 and 7.*—These two views are to be considered together, in that they show closure plugs of the same construction as heretofore discussed, but they are made of very much thicker sheet metal (say double thickness) than the standard or customary gage ordinarily used in the manufacture of the small size plugs 2 as well as large size plugs 2L for electrical raceway systems. It will be noted in the drawings that double thickness sheet metal forms a thick plug 2T, with ears 9T of like gage, thus providing a double thickness but half-length joining-span bending-masses 7M at each end of a double thickness lip 8T because the latter is made somewhat longer, proportionately, than the shorter lip 8 in the thin gage plugs 2 (Figs. 1 thru 5) which are the same size or covering area as the thick gage plug 2T.

As further demonstrated by Figs. 6 and 7, if the metal is increased in gage thickness, to make a heavy or thick gage plug 2T, the slit is proportionately increased in length at 4T. Since the plugs 2 and 2T are the same size (covering area), but 2T is twice the gage of plug 2, it follows that the linear-apex lip-slit means 8T, 4T is lengthened to produce two joining masses 7M which are one-half the length, along the linear apex, of the thinner joining masses 7 of plug 2. Therefore, predetermining the length of the slit 4 or 4T controls the mass (amount of metal) in the deformable joining spans 7 and 7M in accordance with the dimensional proportions (size and thickness) of the closure plug. Such provision renders constant and uniform the mass of the bridging or joining spans 7 in the thin plugs 2 and the mass 7M in the thick plugs 2T in order that the same amount of material be present in both.

Accordingly, the invention provides for thin and thick, as well as small and large plugs, all having uniform or constant bending masses 7 and 7M, etc. In this way, all closure plugs, irrespective of dimensional proportions, alike are readily yieldable and give under the same driving or bending pressure applied to the crest, that is, the linear or the longitudinal apexes of the plugs for flattening out the obtuse angles (Fig. 10) thereof and expanding them into installed (Fig. 12) position.

*Fig. 8.*—Here the same structural formation is shown as above discussed, and the same reference numbers in most part are applied, as in the first views. However, a double or twin lip formation 8D is shown along the angular crest of the closure plug. These double lips 8D are punched and disposed outwardly and face each other at a slight angle to the outer surface of the two angular half portions 2 of the plug; thus forming a slit similar to that heretofore explained, except that such slit is wider as indicated at 4W. The single lip 8 as well as the double lip 8D overlay the slits 4 and 4W, respectively, and perform equally well when installing the plug for closing any opening and function to shut or seal the slit in any of its forms.

The plugs 2, 2L and 2T, etc., are produced in various sizes with the ears 9 and 9T spaced apart for particular size openings as, for example, an aperture or knockout hole H (Fig. 9, etc.) in box B of an electrical raceway system. In manufacture, the ears are spaced for slight clearance when first inserted in the hole H in order to be easily placed. Such clearance is shown at C (Figs. 9 and 10) with the result that the plugs 2, etc. have slightly loose fits when first inserted by the workman. This undersize spacing of the ears, for particular diameters of box holes H, is advisable in order that irregular or rough-hole edges, and sometimes variations in the tolerances thereof, may not interfere with the quick insertion of the plugs into the raceway openings H.

When inserted in the box B, the plug ends 3 overlap and cover the opposite edge portions of the hole H, and the ears 9 extend into the hole beyond the inner surface of the box wall. A light tap or blow from a hammer (applied to the crest or apex of the plug at its parallel slit and lip means 4, 8) acts to flatten out the angle of the plug (Figs. 11 and 12). In response to the driving pressure, the ears 9 expand or spread away from each other, the clearance C disappearing, and said ears becoming engaged, under the flattening pressure of a hammer or other driving tool, with the edge of the box hole H. In this way, the closure plugs are anchored in position and close the opening H.

The operation of flattening out the angle or the slitted linear apex of the plug acts simultaneously to close the overlying lip 8 down into the slit 4, and the closely spaced parallel edges of slit 4 and lip 8 come together in linear engagement. Accordingly, the slit is sealed or shut, and the plug assumes the form of a disk-like cover over the opening H. The lip 8 seals the slit 4 without necessarily being forced all the way thereinto. In other words, if the lip 8 shows its top edge (as in Fig. 12) not entirely flush with the outer surface of the plug, the installation is nevertheless satisfactory due to the aligned sealing of the straight edges of the slit 4 and lip 8, and the reduction of the plug down to approved flattened and imperforate form.

In the event that the closure plug must be removed from the covered opening H, a light tap of a driving tool on the underneath or back side of the plug restores its angular form, also the clearance C, and opens up the slit and lip means 4, 8 (Fig. 10). In this way, the plug of any dimensional proportion is easily removed from the box B or other parts of the raceway system and may be used again.

The disclosure herein explains the principle of the invention and presents the best mode contemplated in applying such principle, so as to distinguish the invention from others; and there is particularly pointed out and claimed, the part, improvement or combination, which constitutes the invention or discovery, as understood by a comparison thereof with the prior art.

This invention is presented to fill the need for a useful hole closure knockout plug. Various modifications in construction, mode of operation, use and method, may and often do occur to others skilled in the art, especially so after acquaintance with an invention. Accordingly, this disclosure is exemplary of the principles and equivalents without being limited to the present showing of the invention.

What is claimed is:

1. A fitting adapted to close an opening, comprising an elongated disk-like member having ends adapted to overlie the opening, and having side edges adapted to coincide with the opening, an ear formed on each side edge adapted to extend into the opening, the disk-like member also having an angular bend extending longitudinally from end to end and forming a linear apex, with a slit extending along the linear apex, the extremities of the slit terminating adjacent the ends of the disk-like member, a lip extending along the linear apex and overlying the slit; whereby a driving pressure exerted on the lip simultaneously flattens the angular bend, forces the lip into the slit, and expands the ears into gripping engagement with the surface defining the opening.

2. A fitting as described in claim 1, and having features in addition thereto, comprising two lips formed parallel with each other along the linear apex, one lip on each side of the slit, the adjacent edges of the two lips overlying the slit; whereby a driving pressure exerted on the lips simultaneously flattens the angular bend, forces the lips into the slit, brings the adjacent edges of the lips together to close the slit, and expands the ears into gripping engagement with the surface defining the opening.

WALTER PETERS.

REFERENCES CITED

The following references are of record in the file of this patent:

UNITED STATES PATENTS

| Number | Name | Date |
| --- | --- | --- |
| 1,491,325 | Thomas, Jr. | Apr. 22, 1924 |
| 1,850,165 | Barnett | Mar. 22, 1932 |
| 1,980,831 | Rosenfield | Nov. 13, 1934 |
| 2,240,187 | Kingdon et al. | Apr. 29, 1941 |
| 2,324,155 | Haynes | July 13, 1943 |
| 2,370,446 | Buchanan | Feb. 27, 1945 |